(12) United States Patent
Nam et al.

(10) Patent No.: US 11,657,368 B2
(45) Date of Patent: May 23, 2023

(54) SERVER AND CONTROL METHOD THEREOF

(71) Applicant: SAMSUNG ELECTRONICS CO., LTD., Suwon-si (KR)

(72) Inventors: Yeonghun Nam, Suwon-si (KR); Junghyun Kim, Suwon-si (KR); Yohan Bae, Suwon-si (KR); Eunok Shin, Suwon-si (KR); Suyeong Lee, Suwon-si (KR); Seungho Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 234 days.

(21) Appl. No.: 16/875,455

(22) Filed: May 15, 2020

(65) Prior Publication Data

US 2020/0364666 A1 Nov. 19, 2020

(30) Foreign Application Priority Data

May 17, 2019 (KR) .......... 10-2019-0058356
Mar. 3, 2020 (KR) .......... 10-2020-0026506

(51) Int. Cl.
*G06Q 10/10* (2023.01)
*G06F 16/438* (2019.01)
(Continued)

(52) U.S. Cl.
CPC ......... *G06Q 10/10* (2013.01); *G06F 16/4387* (2019.01); *G06F 21/6254* (2013.01);
(Continued)

(58) Field of Classification Search
CPC .................. G06F 21/6254; G06Q 50/265
See application file for complete search history.

(56) References Cited

U.S. PATENT DOCUMENTS 6,311,205 B1 * 10/2001 Dutcher ............... H04L 63/08
  709/224
6,574,656 B1 * 6/2003 Nagaoka ............. G06F 21/62
  709/201

(Continued)

FOREIGN PATENT DOCUMENTS

KR  10-2014-0071041 A  6/2014
KR     10-1513769 B1    4/2015

(Continued)

OTHER PUBLICATIONS

Communication dated Dec. 16, 2021 issued by the European Patent Office in European Application No. 20174366.3.

(Continued)

*Primary Examiner* — Douglas B Blair
(74) *Attorney, Agent, or Firm* — Sughrue Mion, PLLC

(57) ABSTRACT

A server and a controlling method thereof in which the server stores information on a data sharing agreement among a plurality of groups and metadata of information on a user included in the plurality of groups. Based on receiving a signal requesting a first type of data included in a second group from an external device of a first group, whether a data sharing agreement for the first type of data is present between the first group and the second group is determined based on the data sharing agreement. Based on identifying that the data sharing agreement for the first type of data is present, whether a user of the second group consents on data sharing of the first type of data is determined based on metadata of information on the user of the second group. If sharing is authorized information for accessing the first type of data of the second group is provided to the external device of the first group.

20 Claims, 7 Drawing Sheets

(51) Int. Cl.
  *G06F 21/62* (2013.01)
  *G06Q 30/02* (2023.01)
  *G06Q 50/26* (2012.01)
  *H04L 67/06* (2022.01)

(52) U.S. Cl.
  CPC .......... *G06Q 30/02* (2013.01); *G06Q 50/265* (2013.01); *H04L 67/06* (2013.01)

(56) References Cited

U.S. PATENT DOCUMENTS

| | | | |
|---|---|---|---|
| 10,043,035 B2 | 8/2018 | LaFever et al. | |
| 10,204,238 B2 | 2/2019 | Sher-Jan et al. | |
| 10,282,740 B1* | 5/2019 | Bramwell | G06Q 30/0239 |
| 10,803,202 B2 | 10/2020 | Brannon et al. | |
| 10,824,758 B2 | 11/2020 | Hankeln et al. | |
| 10,839,099 B2 | 11/2020 | Vogel et al. | |
| 11,403,280 B2* | 8/2022 | Fuchs | G06F 16/2358 |
| 11,449,629 B2* | 9/2022 | Nomura | H04L 67/1097 |
| 2005/0197859 A1* | 9/2005 | Wilson | G16H 10/65 |
| | | | 707/999.009 |
| 2009/0055545 A1* | 2/2009 | Saba | G06Q 10/10 |
| | | | 709/229 |
| 2009/0080635 A1* | 3/2009 | Altberg | H04M 7/003 |
| | | | 379/216.01 |
| 2009/0178121 A1* | 7/2009 | Luttge | H04L 63/104 |
| | | | 726/28 |
| 2011/0196923 A1* | 8/2011 | Marcucci | H04L 67/22 |
| | | | 709/204 |
| 2012/0191715 A1* | 7/2012 | Ruffner | G06F 16/9535 |
| | | | 707/738 |
| 2012/0327093 A1 | 12/2012 | Kang et al. | |
| 2013/0227030 A1* | 8/2013 | Eidelson | H04L 51/32 |
| | | | 709/206 |
| 2015/0012975 A1 | 1/2015 | Hotti | |
| 2016/0014134 A1* | 1/2016 | Holson | H04L 67/306 |
| | | | 726/4 |
| 2016/0283740 A1 | 9/2016 | Roundtree | |
| 2016/0381035 A1 | 12/2016 | Wu et al. | |
| 2017/0134393 A1 | 5/2017 | Islam et al. | |
| 2017/0359613 A1 | 12/2017 | Hedhli et al. | |
| 2018/0307859 A1 | 10/2018 | LaFever et al. | |
| 2019/0114341 A1 | 4/2019 | Schukovets et al. | |
| 2020/0175195 A1* | 6/2020 | Nomura | H04L 67/12 |
| 2020/0183655 A1* | 6/2020 | Barday | H04L 63/20 |
| 2020/0210615 A1 | 7/2020 | Saad et al. | |
| 2020/0285766 A1 | 9/2020 | Jois et al. | |
| 2022/0035950 A1* | 2/2022 | Wakabayashi | G06F 21/6254 |

FOREIGN PATENT DOCUMENTS

| | | | | |
|---|---|---|---|---|
| KR | 10-2016-0120260 A | 10/2016 | | |
| KR | 102179656 B1 | 11/2020 | | |
| WO | WO-0213040 A1 * | 2/2002 | ......... | H04L 63/0823 |
| WO | WO-2015019186 A2 * | 2/2015 | ........... | G06F 21/604 |
| WO | WO-2015198109 A1 * | 12/2015 | ......... | G06F 21/6254 |
| WO | 2019/008548 A1 | 1/2019 | | |

OTHER PUBLICATIONS

Written Opinion (PCT/ISA/237) dated Aug. 14, 2020, issued by the International Searching Authority in International Application No. PCT/KR2020/006353.

International Search Report (PCT/ISA/210) dated Aug. 14, 2020, issued by International Searching Authority in corresponding International Application No. PCT/KR2020/006353.

Communication dated Oct. 23, 2020, issued by the European Patent Office in European Application No. 20174366.3.

* cited by examiner (a) FRIDAY (b) SATURDAY

SERVER AND CONTROL METHOD THEREOF

CROSS-REFERENCE TO RELATED APPLICATION(S)

This application is based on and claims priority under 35 U.S.C. § 119(a) to Korean Patent Application No. 10-2020-0026506, filed on Mar. 3, 2020, and Korean Patent Application No. 10-2019-0058356, filed on May 17, 2019, in the Korean Intellectual Property Office, the disclosures of which are incorporated by reference herein in their entireties.

BACKGROUND

1. Field

The disclosure relates to a server and a method of controlling the server. More specifically, the disclosure relates to a server for controlling data sharing between heterogeneous groups based on a data sharing agreement and a user consent for data sharing.

2. Description of Related Art

With the importance of protecting personal information, jurisdictions have established laws and agencies to protect personal information, and companies have established regulations on the procedures required to utilize or share collected personal information.

However, laws or regulations for protecting personal information and system processes for sharing real personal information are not organically combined. Therefore, if a server of a specific group requests sharing of personal information to a server of another group, there is a limit in that the server needs to separately identify whether sharing the personal information would meet various laws or regulations.

SUMMARY

Aspects of the disclosure may address at least the above-mentioned problems and/or disadvantages and to provide advantages described herein. Accordingly, an aspect of the disclosure may provide an apparatus and method for understanding received speech.

Additional aspects will be set forth in part in the description which follows and, in part, will be apparent from the description, or may be learned by practice of the presented embodiments.

In accordance with an aspect of the disclosure, there is provided a server including a communicator, a memory storing information representing a data sharing agreement among a plurality of groups and metadata of information of users included in the plurality of groups, and a processor configured to, based on receiving from an external device of a first group among the plurality of groups, through the communicator, a signal requesting a first type of data from a second group among the plurality of groups, identify whether the data sharing agreement indicates that sharing the first type of data between the first group and the second group is authorized based on the information on the data sharing agreement, based on identifying that sharing the first type of data between the first group and the second group is authorized, identify whether a user of the second group authorizes sharing of the first type of data based on metadata of information on the user of the second group among the metadata of information of the users included in the plurality of groups, and based on identifying that the user of the second group authorizes sharing of the first type of data, control the communicator to transmit information on an authority for the external device of the first group to access the first type of data of the second group.

In accordance with an aspect of the disclosure, there is provided a method of controlling a server storing information on a data sharing agreement among a plurality of groups and metadata of information on a user included in the plurality of groups including, based on receiving, from an external device of a first group among the plurality of groups, a signal requesting a first type of data from a second group among the plurality of groups, identifying whether the data sharing agreement indicates that sharing the first type of data between the first group and the second group is authorized based on the information on the data sharing agreement, based on identifying that sharing the first type of data between the first group and the second group is authorized, identifying whether a user of the second group authorizes sharing of the first type of data based on metadata of information on the user of the second group among the metadata of information of the users included in the plurality of groups, and based on identifying that the user of the second group authorizes sharing of the first type of data, transmitting information on an authority for the external device of the first group to access the first type of data of the second group.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
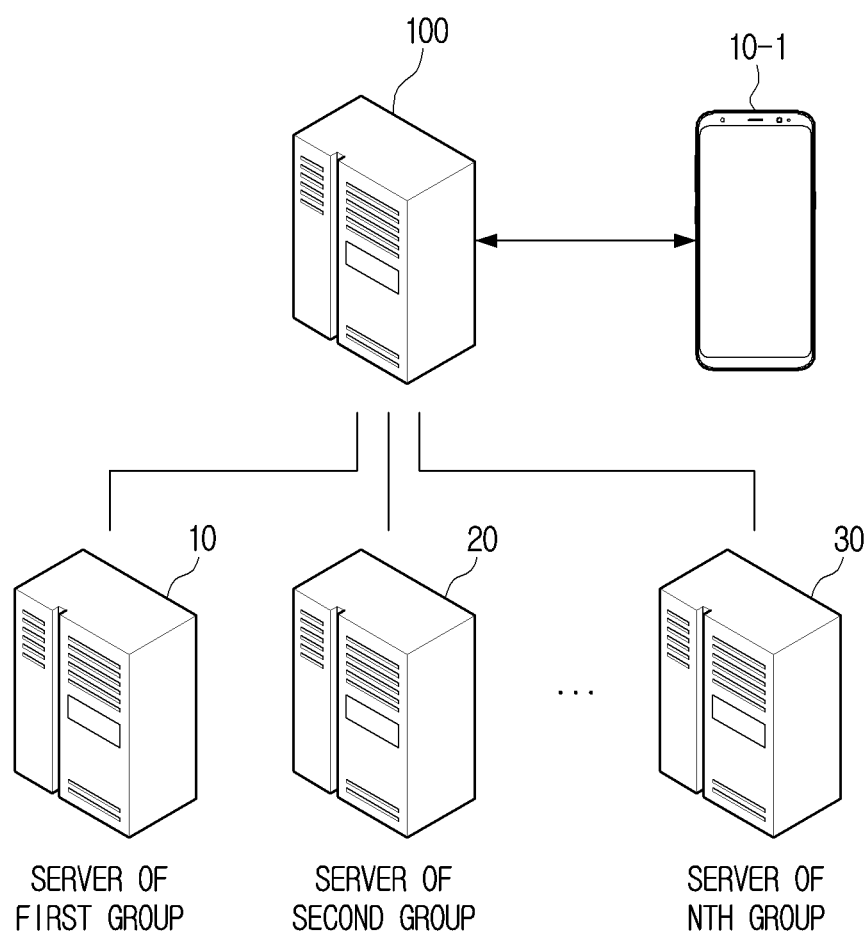
FIG. 1 is a diagram illustrating a process of a server controlling data sharing among a plurality of groups according to an embodiment of the disclosure.

The terms and words used in the following description and claims are not limited to the bibliographical meanings, but, are merely selected to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, embodiments of the disclosure will be described with reference to the accompanying drawings. However, it may be understood that the disclosure is not limited to the embodiments described hereinafter, but also includes various modifications, equivalents, and/or alternatives of the embodiments of the disclosure. In relation to explanation of the drawings, similar drawing reference numerals may be used for similar constituent elements.

The disclosure may address the above-mentioned problems, and an object of the disclosure provides a server and a controlling method thereof, capable of monitoring data sharing request status between heterogeneous groups, and controlling data sharing between the heterogeneous groups based on a data sharing agreement and a user consent.

The disclosure relates to a server for monitoring a data sharing request status among a plurality of groups, controlling and managing data sharing between each group based on information on data sharing agreement among the plurality of groups and metadata for information of a user included in a plurality of groups, and a controlling method thereof. That is, the server 100 may control such that a data sharing agreement exists in each of the heterogeneous servers and data may be freely shared within a range consented by the user.

In describing the embodiments, a data sharing agreement may refer to data processing agreement (DPA) (or personal information processing agreement in accordance with general data protection regulation (GDPR) (or Personal Information Protection Act) which is enforced for European Union (EU) member countries. This is merely one embodiment, and the data sharing agreement may be an agreement related to data sharing between each of a plurality of groups or a law proclaimed for the protection of personal information of each of the plurality of groups.

In describing the embodiments, a group may mean a group that is classified based on a predefined criterion. Examples of groups include, but are not limited to, countries, enterprises, regions, organizations, international organization, and the like, and the group is not limited thereto unless otherwise specified.

According to the disclosure, a server (or cloud, virtual server) may process the personal information for only the purpose being consented from the subject of the personal information. Here, the personal information may refer to information associated with a person for identifying a person or information that is easily combined with other information for identifying a person. A consent may refer that a subject of personal information expresses an affirmative intention about processing of the personal information through statements or active behaviors. Processing the personal information may refer to an action of collecting, generating, recording, storing, processing, editing, searching, using, providing, publishing, or the like, of personal information.

The server may process the personal information for stripping identifying characteristics of the personal information without a consent of the subject of the personal information. Here, the de-identification, stripping, or anonymizing may mean that some or all of the personal information may be removed, exchanged, replaced, or a similar action is performed, so that the individual user associated with the personal information may not be identified. Examples anonymizing include, but are not limited to, alias, exchange, pseudonymization by encryption, aggregation, data reduction, data suppression, data masking, or the like, but are not limited to the above examples unless otherwise specified.

The adequacy of the anonymizing operation may be assessed through a privacy protection model that defines a quantitative risk for privacy exposure. Examples of the privacy protection model include a k-anonymity model, l-diversity model, t-closeness model, m-privacy model, a model that performs a differential privacy algorithm, or the like. However, the privacy protection model in the disclosure is not limited to the above-mentioned examples except specified.

The server may transmit the collected personal information to an electronic device included in another group (e.g., country, etc.). In one embodiment, a server may transfer the collected personal information to an electronic device included in another group without limitation. In another embodiment, the server may transmit collected personal information to the electronic device included in the other group, if it is recognized that the personal information protection level of the other group including the electronic device from the group including the server is equivalent to the level of protection of the group including the server. In another example, if the server is granted permission that an agreement includes rule or regulation for protecting personal information from a group that includes the server, the server may transmit the collected personal information to the electronic device included in the other group. In another embodiment, if a server is granted permission from a group including the server, the server may transmit copies of the collected personal information to the electronic device that is included in the other group.

The embodiment will be further described with reference to the drawings so that those skilled in the art can easily implement the embodiment.

FIG. 1 is a diagram illustrating a process of a server controlling data sharing between a plurality of groups, in accordance with an embodiment. The server 100 is a server for controlling data sharing between a plurality of groups of servers and may be represented as a central server or a governance server. Thus, in describing the embodiments, if the server 100 is described as not being a server of a specific group, then the server 100 refers to a central server or a governance server.

As illustrated in FIG. 1, the server 100 may be implemented as one server, but such configuration is merely exemplary, and the server 100 may be implemented as a plurality of servers. For example, the server 100 shown in FIG. 1 may include a metadata server for storing information about a plurality of groups of users, an account server for identifying a group identification (ID) corresponding to the external device through a signal received from the external device, and a control server for monitoring data sharing request between groups and providing information about an access token, or the like.

Referring FIG. 1, servers 10, 20, 30 of a plurality of groups may store information about users included in each group respectively managed by each server. The information about the user may refer to the personal information of the user. The personal information of the user can refer to information for identifying a user or information that may be easily combined with other information to identify a user. For example, the user's personal information may include, but is not limited to, an e-mail address of a user, a user face, a device or a usage history of an application within the device, a telephone number, and the like, except for the case in which the personal information of the user is specified.

Referring FIG. 1, upon receiving a signal requesting the first type of data included in a second group (or the server in the second group) from an external device 10-1 of the first group, the server 100 may identify whether the data sharing agreement exists in the first group and the second group based on the information on the data sharing agreement. The external device 10-1 of the first group may refer to an electronic device belonging to a user of the first group or an electronic device which is made in the first group and can utilize a part or whole of the information stored in the first group server 10 in the first group or in the first group. In FIG. 1, the external device 10-1 of the first group is implemented as a smartphone, but this is merely exemplary, and the external device 10-1 may include at least one of a tablet personal computer (PC), a desktop PC, a laptop PC, a netbook computer, a display device, a cloud or other type of server, a personal digital assistant (PDA), a medical device, or a wearable device. In some embodiments, the external device may include at least one of, for example, a television, a refrigerator, an air conditioner, an air cleaner, a set-top box, a media box (ex: Samsung HomeSync™, Apple TV™, or Google TV™).

In one embodiment, if a server 10 of the first group is a server of company AA in Korea and a server 20 of the second group is a server of company A B in Europe, an external device 10-1 of the first group may be a smartphone which is used in Korea, or which may use information stored in a server of company A A in Korea. In case of requesting information about an e-mail of a European user stored in a server of company A B by a smartphone used in Korea, the server controlling the data sharing of the entire server of the company A A may identify whether there is a data sharing agreement for the e-mail between company A A of Korea and company A B in Europe based on the information on the data sharing agreement located in each country or region.

Information about the data sharing agreement among a plurality of groups may include information about whether the data sharing agreement exists for each of a plurality of data types among the plurality of groups. For example, the information about the data sharing agreement among the plurality of groups may include information as to whether there is a data sharing agreement for information for a device usage history between the first group and the second group.

The information on the data sharing agreement between the plurality of groups may be configured in a form of a matrix. When a plurality of groups are N number of groups (where N is a natural number greater than or equal to 2), information on a data sharing agreement between a plurality of groups may be composed of an N×N matrix, and an element included in the matrix may be a vector capable of identifying whether the sharing agreement is present for each data type. For example, information about a data sharing agreement between a plurality of groups may be implemented as shown in Equation 1 below.

$$M = \begin{bmatrix} J_{11} & \cdots & J_{1N} \\ \vdots & \ddots & \vdots \\ J_{N1} & \cdots & J_{NN} \end{bmatrix} \text{ where } J_{xy} = [J_1 J_2 \ldots J_L] \quad \text{[Equation 1]}$$

$(1 \leq x, y \leq N)$ and $j_l \in \{0, 1\}$ for $1 \leq j \leq 1$.

In Equation 1, M refers to a matrix including information on a data sharing agreement between N groups. The information on the data sharing agreement between the first group and the second group may be information configured in the form of a vector located in the (1,2) or (2,1) components of M.

Referring to Equation 1, $J_{xy}$ refers to a vector including information on whether a data sharing agreement is present with respect to each of a plurality of types of data between an x group and a y group. If the x group and the y group form a data sharing agreement for the $i^{th}$ type of data, $j_i=1$, and if the data sharing agreement has not been established, $j_i=0$. In addition, L of Equation 1 may be a natural number greater than or equal to 1. Thus, the server 100 may identify whether there is an agreement on the first type of data sharing between the first group and the second group based on information about the data sharing agreement between the plurality of groups implemented with the matrix and the vector.

In one embodiment, if it is identified that the agreement for the first type of data sharing is present, the server 100 may identify whether the user of the second group has agreed upon the first type of data sharing based on the metadata of the information for the user of the second group of metadata of information for the user included in the plurality of groups. Specifically, the server 100 may identify a data usage type (or purpose) corresponding to a signal received from the external devices 10-1 in the first group. For example, the server 100 may identify, via a signal received from the external devices of the first group 10-1, that the external devices of the first group 10-1 utilize the first type of data of the second group for a marketing purpose or a research purpose. The server 100 may identify whether a marketing purpose or a research goal is included among the data usage types approved by the user of the second group through the metadata of the information for the user of the second group. In another embodiment, if it is identified that there is no agreement on the first type of data sharing between the first group and the second group, the server 100 may transmit a signal to the external device 10-1 of the first group that first type of data may not be shared.

The metadata of the information for the user may include information about the type of information for the user and the data usage type (or purpose) consented by the user. The metadata may be implemented as shown in Table 1.

TABLE 1

| Dataset ID | Personal information vector | Usability vector | Organization ID |
|---|---|---|---|
| $d_a$ | $I_a$ | $U_a$ | $O_a$ |

In Table 1, $d_a$ refers to an identification (ID) capable of identifying a data set corresponding to metadata, and an $I_a$ (or a personal information vector) refers to data in which a type of information for a user is configured in a vector form, and it may be implemented according to Equation 2. In Equation 2, L refers to the number of types of information for a user, and the natural number of 1 or higher. If $i_l$ is 0, the $1^{st}$ type of data for the information of the user is not included, and when $i_l$ is 1, then the first type of data for the information of the user is included.

$$I_a = [i_1 \ i_2 \ldots i_L] \text{ and } i_l \in \{0,1\} \text{ for } 1 \leq l \leq L. \quad \text{[Equation 2]}$$

The Ua refers to data in which information on a data usage method consented by the user is configured in a vector form, and may be expressed by Equation 3. In Equation 3, M refers to the number of data usage type (or purpose) consented by the user, and is the natural number greater than or equal to 1. Data usage type (or purpose) may include, but is not limited to, marketing utilization, machine learning utilization, research, and the like, and is not limited thereto. If $u_m$ is 0, then the user agrees to the $m^{th}$ data utilization method, and when $u_m$ is 1, then the user agrees to the $m^{th}$ data utilization method.

$$U_a=[u_1\ u_2 \ldots u_M] \text{ and } u_m \in \{0,1\} \text{ for } 1 \leq m \leq M \qquad \text{[Equation 3]}$$

In Equation 3, $U_a$ refers to the ID capable of identifying each group, and the server 100 may identify a group corresponding to metadata among the plurality of groups through $U_a$.

Before transmitting a signal requesting data of another group to the server 100, each of the servers of the plurality of groups may generate and transmit metadata of the collected information for the user and transmit the same to the server 100. For example, the first group server 10 may generate and transmit metadata in which the collected information on the user included in the first group is structured and transmit the same to the server 100. If information on the user included in the first group needs to be modified and the metadata is changed, the server 10 of the first group may transmit the modification information to the server 100. This embodiment will be described in detail with reference to FIG. 3.

If it is identified that the user of the second group agrees on the first type of data sharing, the server 100 may transmit information about the authority for accessing the first type of data of the second group to the first group external device 10-1. Specifically, if users of the second groups agree on the first type of data sharing, the server 100 may request information about the authority that the second group of servers 20 may access the first type of data for a predetermined amount of time. Upon receiving information about the authority for accessing the first type of data for a predetermined time from the second group of servers 20, the server 100 may transmit information about the authority for accessing the first type of data received from the second group of servers 20 to the external devices of the first group 10-1.

The information about the authority for accessing the first type of data in the second group may include information about the access token for accessing the first type of data of the second group for a predetermined time. Thus, the external devices of the first group 10-1 may access a region in which the first type of data of the second group is stored via the access token received from the server 100, and may utilize the first type of data for a predetermined time in the accessed region as a usage type (or purpose) identified as being consented by the user of the second group.

If it is identified that the second group have not agreed upon the first type of data sharing, the server 100 may transmit, to the first group external device 10-1, a signal indicating that the first type of data of the second group may not be shared.

In another embodiment, the first group of external device 10-1 may transmit a signal requesting the entirety of the second group data instead of a specific type data of the second group. Upon receiving a signal requesting the entirety of the second group data from the first group external device 10-1, the server 100 may identify the type of data when a data sharing agreement exists between the first group and the second group based on information about the data sharing agreement between the plurality of groups from the first group external device 10-1. The server 100 may identify the type of usage (or purpose) consented by the user of the second group based on the metadata of the information for the user of the second group among metadata of the information for the user included in the plurality of groups.

The server 100 may transmit data of a type in which a data sharing agreement exists between the first group and the second group and information on a data usage method (or purpose) consented by the user of the second group to the external device 10-1 of the first group. In addition, upon receiving a signal requesting the second type of data in which the data sharing agreement consented by the users of the second group exists from the external devices of the first group 10-1 by the data usage type (or purpose) consented by the users of the second group, the server 100 may transmit information about the authority for accessing the second type of data of the second group to the external device 10-1 of the first group.

Figure 2:
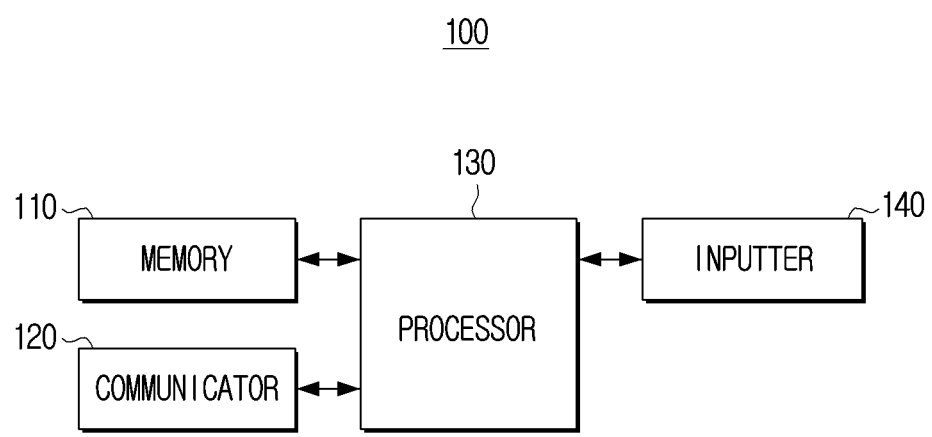
FIG. 2 is a block diagram illustrating a configuration of a server according to an embodiment of the disclosure.

FIG. 2 is a block diagram illustrating a configuration of the server, according to an embodiment of the disclosure.

Referring FIG. 2, the server 100 may include a memory 110, a communicator 120, a processor 130, and an inputter 140. However, the configuration shown in FIG. 2 is an example for implementing embodiments, and appropriate hardware and software configurations that would be apparent to those skilled in the art may be further included in the server 100.

The memory 110 may store instructions or data for controlling or interacting with at least one other component of the server 100. The memory 110 may be accessed by the processor 130, and reading/writing/modifying/updating of data by the processor 130 may be performed in conjunction with the memory.

The memory 110 may store an instruction set corresponding to at least one program that the processor 130 may execute. An instruction refers to one computer programming statement of a programming, coding, or hardware encoding language the processor 130 may execute, and is a minimum unit for the execution or operation of the program.

The memory 110 may store information about a data sharing agreement between a plurality of groups and metadata of information for a user included in the plurality of groups. The memory 110 may store information on the authority for accessing data stored in a specific group of servers received from a specific group of servers for a predetermined time.

The memory 110 may be implemented as a non-volatile memory, a volatile memory, a flash memory, a hard disk drive (HDD), a solid state drive (SSD), or the like. In the disclosure, the term memory may include the memory 110, read-only memory (ROM) in the processor 130, random access memory (RAM), or a memory card (for example, a micro secure digital (SD) card, and a memory stick) connected to the server 100. In addition, the memory 110 may store programs and data for configuring various application screens and user interfaces to be displayed in the display region of the display.

The communicator 120 may be a communication interface that includes circuitry, and may perform communication with a plurality of groups of servers, a plurality of groups of external devices, or other devices. Specifically, the processor 130 may receive and transmit data or information from a plurality of groups of servers, a plurality of groups of external devices, or other devices via the communicator 120. For example, the communicator 120 may receive metadata of information for each user of a plurality of groups from each of a plurality of groups of servers. Further, the communicator 120 may receive information that may be used to modify the metadata from each of the plurality of groups of servers.

The communicator 120 may receive a signal requesting data collected by another group (or a group of servers) from a particular group of external devices or servers. In this case, a signal requesting collected data received from a specific group may include an ID capable of identifying an external device of a specific group, a time for utilizing the collected data, a method of using the data, and the like.

The communicator 120 may receive information on the authority for accessing data collected from a server of each of the plurality of groups from a server of each of the plurality of groups. The communicator 120 may transmit information on the authority for accessing the received data of the specific group to the server requesting the data.

The communicator 120 may include various communication modules to perform communication with an external device. For example, the communicator 120 may include a wireless communication module, for example, a cellular communication module using at least one of long-term evolution (LTE), LTE advanced (LTE-A), a code division multiple access (CDMA), a wideband CDMA (WCDMA), a universal mobile telecommunications system (UMTS), a wireless broadband (WiBro), $5^{th}$ generation (5G), a global system for mobile communications (GSM), and the like. As another example, the wireless communication module may include at least one of, for example, wireless fidelity (Wi-Fi), Bluetooth, Bluetooth low energy (BLE), Zigbee, or the like.

The processor 130 may be electrically connected to the memory 110 by wires and one or more buses and control overall operations of the server 100. The processor 130 may be configured as one or a plurality of processors, or may be a general-purpose processor such as a central processor (CPU), but this is merely exemplary, and the processor 130 may be implemented as a graphics-only processor such as a graphics processor (GPU), a vision processing u (VPU), an AI-only processor such as a neural network processor (NPU), or the like, but is not limited thereto.

In one embodiment, when a signal requesting a first type of data included in a second group from an external device of the first group is received via the communicator 120, the processor 130 may identify whether there is a data sharing agreement specifying the first type of data between the first group and the second group based on information on the data sharing agreement stored in the memory 110. The request signal the processor 130 receives from the external device of the first group may be as shown in Table 2.

TABLE 2

| Requested user ID | Dataset ID | Usability Request vector | Usage Period |
|---|---|---|---|
| $u_{req}$ | $d_a$ | $R_{req}$ | $[t_{from}, t_{to}]$ |

The $u_{req}$ in Table 2 is an external device ID capable of identifying a first group external device, and $d_a$ is the ID that is capable of identifying a data set of a group requested by the external of the first group. In addition, $R_{req}$ is the data representing the scheme (or purpose) in which the external device of the first group is to utilize the data of the first type of the second group, and may be configured in a form of a vector as shown in Equation 4 below.

$$R_{req}=[r_1\ r_2\ \ldots\ r_M]\text{ and }r_m \in \{0,1\}\text{ for }1 \leq m \leq M. \quad \text{[Equation 4]}$$

The $r_m$ is a value for identifying whether a request is made to utilize the data as an $m^{th}$ usage type (or a purpose). In this case, the usage type may be M number of usage types (or purposes), such as marketing utilization, machine learning utilization, research, or the like. If the $r_m$ is 1 (one), then the first group external device requests that the first type of data of the second group be utilized in the $m^{th}$ usage type, and if $r_m$ is 0 (zero), then the first group external device does not request that the first type of data of the second group be utilized in the $m^{th}$ usage type.

The term $[t_{from}, t_{to}]$ may refer that the external device of the first group requests utilization of the first type of data of the second group during a period between $t_{from}$ and $t_{to}$.

The processor 130 may identify the first group ID ($O_a$ or organization ID) through the first group external device ID ($u_{req}$ or requested user ID) included in the request signal received from the external devices of the first group. The processor 130 may identify information on the data sharing agreement between the first group and the second group from among information on the data sharing agreement between the plurality of groups stored in the memory 110. For example, if the information on the data sharing agreement between the plurality of groups is configured in a form of an N×N matrix as shown in Equation 1, the processor 130 may identify the components located in (1, 2) among the plurality of components of the matrix M, that is, the vectors ($J_{1,2}$) including information about the data sharing agreement between the first group and the second group.

The processor 130 may identify whether the element corresponding to the first type of data is 1 between vectors $J_{1,2}$ in order to identify whether there is a data sharing agreement between the first group and the second group in relation to the first type of data. If the element corresponding to the first type of data is $j_1$ that is the first element of $J_{1,2}$, when $j_1$, which is the first element of the vectors $J_{1,2}$, is 1, then the processor 130 may identify that there is a data sharing agreement between the first group and the second group with respect to the first type of data. If $j_1$ is zero (0), the processor 130 may identify that there is no data sharing agreement between the first group and the second group with respect to the first type of data.

In one embodiment, the processor 130 may perform the above-described embodiment via Equation 5 below. For example, according to Equation 5 below, $j_1$ is and $i_1$ is 1, indicating that data of the first type of information associated with the users of the second group is included, $j_l-i_l$ value is 0 and thus, $V_{personal}$ value is 1. Because the $V_{personal}$ value is 1, the processor 130 may identify that there is a data sharing agreement for the first type of data between the first group and the second group.

$$V_{personal} = \begin{cases} 1, & j_l - i_l \geq 0 \text{ for } \forall\ 1 \leq l \leq L \\ 0, & \text{otherwise} \end{cases} \quad \text{[Equation 5]}$$

If it is identified that there is the data sharing agreement associated with the first type of data, the processor 130 may identify whether the users of the second groups agree on the first type of data sharing based on the metadata of the information associated with the user of the second group among metadata of information associated with the user included in the plurality of groups stored in the memory 120. Specifically, the processor 130 may identify a data usage type (or purpose) that corresponds to a signal received from the external devices of the first group. Referring Table 2, the request signals received from the external devices of the first group may include information about the scheme in which the external devices of the first group wish to use the data in the form of the vector ($R_{req}$).

The processor 130 may identify whether the user of the second group has agreed on the first type of data sharing based on the vector Ua including the information on the usage type consented by the user among the vector ($R_{req}$) included in the request signal received from the first group external device and the metadata of the information associated with the users of the second group. For example, the processor 130 may identify whether the users of the second groups have agreed upon the data usage type (or purpose) requested by the external devices of the first group via the following Equation 6:

$$V_{usability} = \begin{cases} 1, & u_m - r_m \geq 0 \text{ for } \forall\, 1 \leq m \leq M \\ 0, & \text{otherwise} \end{cases} \quad [\text{Equation 6}]$$

For example, when the external device of the first group requests the first type of data of the second group for marketing and research, and the marketing and research use corresponds to the first and third elements of the vector ($R_{req}$), the first element r1 and the third element r3 among $R_{req}$ may be 1. In addition, when the user of the second group does not agree to the use of data for marketing purposes and agrees to the research purpose, the first element ($u_1$) of Ua included in the metadata is 0 and the third element $u_3$ is 1. Thus, because $u_1 - r_1$ is −1 and $V_{usability}$ is 0, the processor 130 may identify that the users of the second group do not agree to utilizing the data for marketing. Because $u_3 - r_3$ is 0 and $V_{usability}$ is 1, the processor 130 may identify that the users of the first group agree to utilizing the data for research.

If it is identified that the user of the second group agrees to the first type of data sharing, the processor 130 may control the communicator 120 to transmit information about the authority for accessing the first type of data of the second group to the external devices of the first group. The information about the authority for accessing the first type of data in the second group can include information about the access token for accessing the first type of data of the second group for a predetermined time. The predetermined time may be from the time $t_{from}$ to $t_{to}$ included in the request signal of the external device of the first group.

In one embodiment, if the users of the second group have consented to the first type of data sharing, the processor 130 may control the communicator 120 to transmit a signal requesting information about the authority for accessing the first type of data for a predetermined amount of time to the server of the second group. The processor 130 may then transmit information about the authority received from the servers of the second group to the external devices of the first group.

In another embodiment, the processor 130 may be authorized to receive information about an access token for accessing data collected at a server of a particular group via the communicator 120 from the servers of a particular group, and to transmit information about the access token to another group when the predefined condition is satisfied. The predefined condition may be whether there is a data sharing agreement between a particular group and another group and whether the user of each group agrees to the data utilization. For example, if the user of the second group is identified to agree on the first type of data sharing, the processor 130 may transmit information about the access token to the external devices of the first group, including the predetermined time for utilizing data. The external devices of the first group may use the received access token to access the first type of data of the second group for a predetermined time.

If it is identified that there is no data sharing agreement on the first type of data between the first group and the second group, or if the usage type requested by the external devices of the first group is not included in the data usage type consented by the users of the second group, the processor 130 may control the communicator 120 to transmit, to external devices of the first group, a signal that the first type of data may not be shared.

According to another embodiment, when a signal requesting a data of a third group from an external device of the first group is received through the communicator 120, the processor 130 may identify a data type in which the data sharing agreement between the first group and the third group based on information on the data sharing agreement between the plurality of groups. The external devices of the first group may transmit a signal, to the processor 130, requesting the entire data of the third group, rather than requesting data of a particular type of the third group. The processor 130 may identify which element is 1 in the vector of $J_{1,3}$ or $J_{3,1}$ located in (1,3) or (3,1) among the information about the data sharing agreement between the plurality of groups consisting of the N×N matrix. For example, if there is a data sharing agreement associated with e-mail and telephone numbers in $J_{1,3}$, and e-mail and telephone numbers correspond to the first and third elements, the values of $j_1$ and $j_3$ may be 1. Because the value of $j_1$ and $j_3$ is 1, the processor 130 may identify that there is a data sharing agreement for the email and telephone number of the plurality of data types.

The processor 130 may identify the usage type of the identified data type consented by the user of the third group based on the metadata of the information for the user of the third group among metadata of the information for the user included in the plurality of groups stored in the memory 110. For example, the processor 130 may identify, via metadata of information for users of the third group, that the users of the third group only agree to share data for research purposes.

The processor 130 may control the communicator 120 to transmit information about the identified data type and the usage type identified as consented by the user of the third group to the external device of the first group. For example, the processor 130 may transmit information, to the external devices of the first group, that information about email and telephone numbers in the data of the third group may be utilized for research purposes only.

When a signal requesting the second type of data is received, from the external device of the first group, through the communicator 120, to use the second type of data among the identified data types as the data usage type consented by the users of the third group, the processor 130 may control the communicator 120 to transmit information on the authority for accessing the second type of data to the external device of the first group. For example, upon receiving a signal, through the communicator 120, requesting information about the e-mail to utilize information about the e-mail from the external devices of the first group for research purposes, the processor 130 may transmit information about the access token to the external device of the first group for accessing information about the e-mail of the third group for a predetermined amount of time included in the request signal.

The inputter 140 includes a circuitry and hardware as a user interface for providing input between the server and a user, and the processor 130 may receive a user command for controlling the operation of the server 100 through the inputter 140. The inputter 140 may include a touch sensor, a (digital) pen sensor, a pressure sensor, a key, or a microphone. The inputter 140 may also include a graphical user interface displayed on a display of the server 100, or displayed on another user device in communication with the server 100 for controlling the server via the use device. The touch sensor may use at least one of, for example, electrostatic, pressure-sensitive, infrared, or ultrasonic methods.

For example, the inputter 140 may receive a command for requesting, to the server of a specific group, a signal requesting information on the authority for accessing specific data stored in a server of a specific group through the inputter 140.

Figure 3:
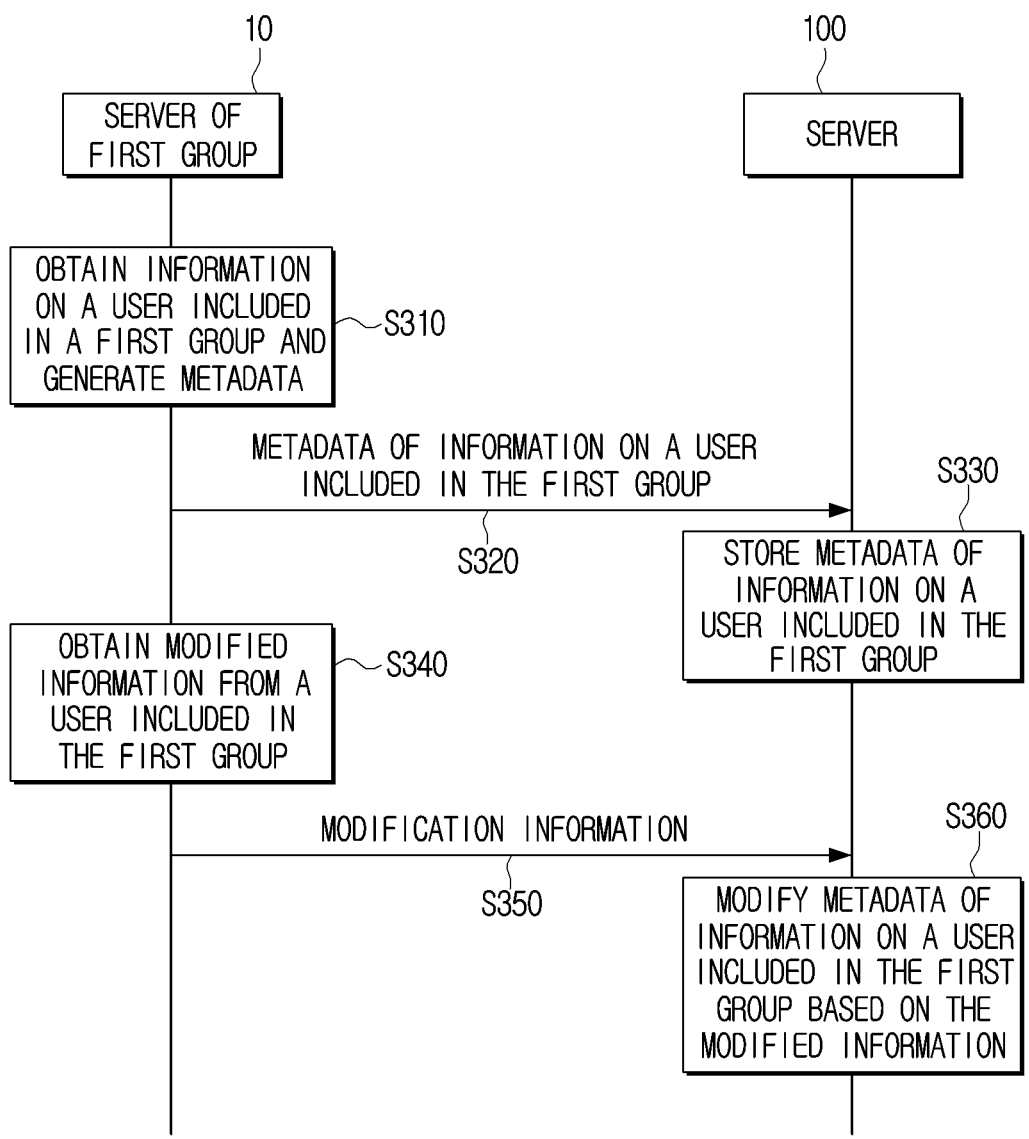
FIG. 3 is a flowchart illustrating a process of transmitting metadata for personal information collected by each group to a governance server according to an embodiment of the disclosure.

FIG. 3 is a flowchart illustrating a process of transmitting metadata for personal information collected by each group to a governance server according to an embodiment.

The server 10-1 of the first group of the plurality of groups may obtain information about a user included in the first group and generate metadata of the information for the user included in the first group in operation S310. For example, the server 10-1 of the first group may classify the collected information about the user by types, and may configure a personal information vector, which is an element of the metadata, as shown in Table 1. For example, if the information corresponding to the first element of the personal information vector is an e-mail, and the e-mail information is collected from the user of the first group, the server 10-1 of the first group may set the first element of the personal information vector to 1.

The server 10-1 of the first group may identify a data usage type (or purpose) consented by the user, and configure a usability vector, which is an element of the metadata based on the identified data usage type (or purpose). For example, if the usage type corresponding to the first element of the usability vector is marketing, and the users of the first group agree on utilizing the data for marketing purposes, the server 10-1 of the first group may set the first element of the usability vector to 1.

The server 10-1 of the first group may transmit the metadata of the information for the user included in the first group to the server 100 in operation S320. The server 100 may store the metadata of the information about the user of the first group received from the server 10-1 of the first group in operation S330. The server 100 may control data sharing between the first group and one or more other groups based on the stored metadata.

The server 10-1 of the first group may obtain modification information from the user included in the first group in operation S340. For example, the server 10-1 of the first group may modify the metadata to correspond to changes authorized by the user if the collected information about the user has changed, such as if the users of the first group do not agree on a particular data usage type, new types of data are collected, or the like. The server 10-1 of the first group may transmit modification information for the metadata to the server 100 in operation S350.

The server 100 may modify the metadata of the information for the user included in the first group based on the modification information received from the server 10-1 of the first group in operation S360. The server 100 may control the data sharing between the first group and another group based on the updated metadata.

Figure 4:
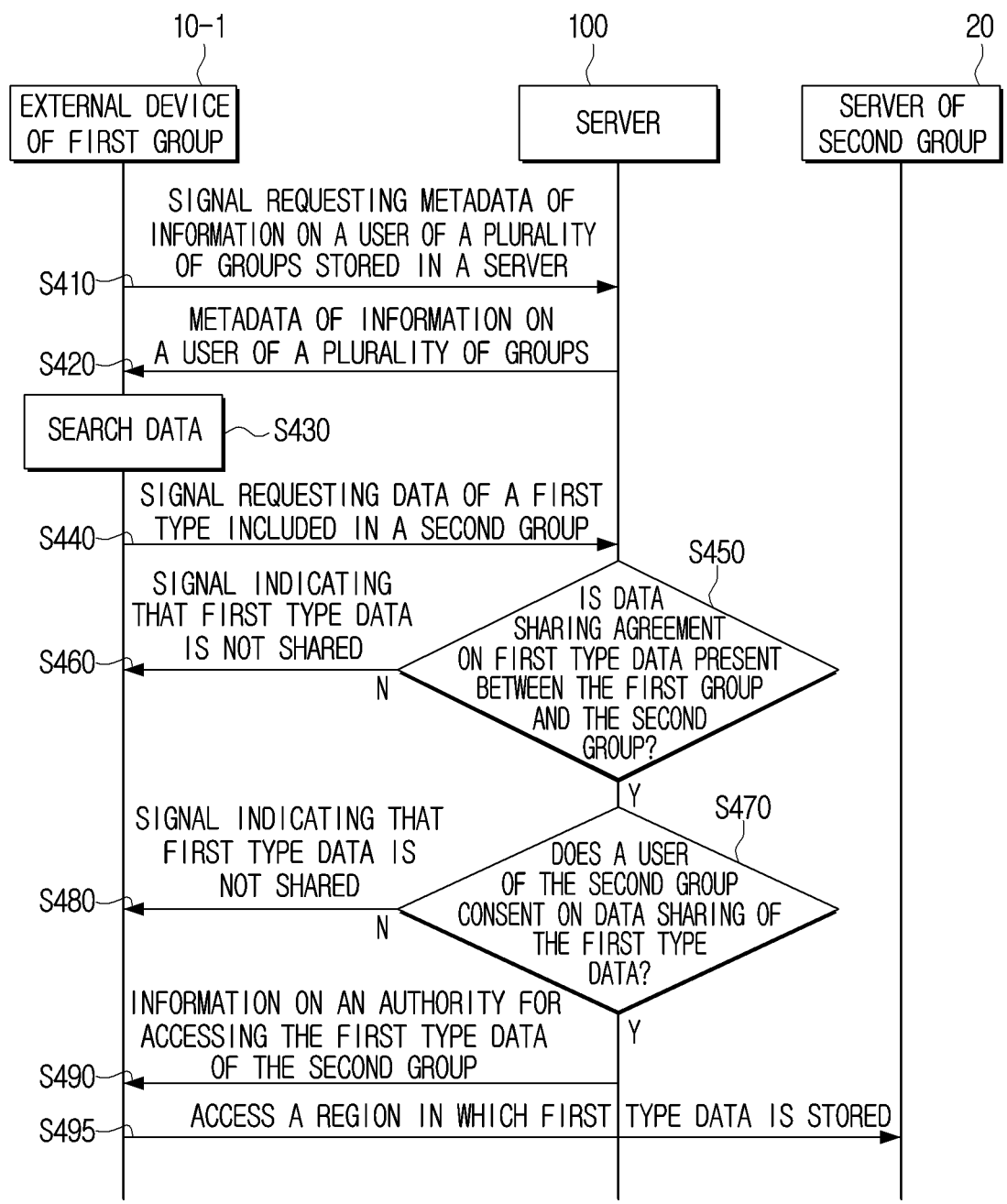
FIG. 4 is a sequence diagram illustrating a method of a server controlling data sharing among each group according to an embodiment of the disclosure.

FIG. 4 is a sequence diagram illustrating a method of a server controlling data sharing among groups according to an embodiment. A process of receiving by the server 100 the metadata from a server of each group has been described with reference to FIG. 3 and will redundant descriptions of already-described operations will be omitted.

The external device 10-1 of the first group may transmit a signal requesting metadata of information for a user of a plurality of groups stored in the server 100 in operation S410. However, this is merely exemplary, and the external device 10-1 of the first group may transmit, to the server 100, a signal requesting metadata of information for a particular group of users among the plurality of groups. The server 100 may transmit metadata of information about a user of a plurality of groups (or a specific group requested by the external device 10-1 of the first group) to the external device 10-1 of the first group in operation S420.

In step S430, the external device 10-1 of the first group may search the data to be requested to the server 100 through the metadata of the received information about the user of the plurality of groups (or a particular group). If the first type of data of the second group is identified as needed, the external device 10-1 of the first group may transmit, to the server 100, a signal requesting the first type of data of the second group in operation S440. The request signal may be configured as shown in Table 2. Upon receiving the request signal, the server 100 may identify whether there is an agreement on the first type of data between the first group and the second group on the basis of the information on the data sharing agreement among the plurality of groups in operation S450. For example, the server 100 may identify whether there is an agreement on the first type of data between the first group and the second group based on information about the data sharing agreement between the plurality of groups configured in the form of an N×N matrix, such as Equation 1. For example, the server 100 may identify vectors $J_{1,2}$, or $J_{2,1}$ located in either of the matrices (1,2) or (2,1) to identify the presence or absence of data agreement between the first group and the second group. The server 100 may identify whether the value of the element corresponding to the first type of data is 1 or 0 among vectors $J_{1,2}$, or $J_{2,1}$. For example, if the value of the element corresponding to the first type of data is zero, the server 100 may identify that there is no agreement on the first type of data between the first group and the second group, and transmit, to the external device 10-1 of the first group, a signal that the first type of data may not be shared in operation S460.

As another example, if the value of the element corresponding to the first type of data is 1, the server 100 may identify that there is an agreement on the data between the first group and the second group, and identify whether the user of the second group has agreed upon the data sharing for the first type of data based on the metadata of the information for the user of the second group in operation S470. For example, the server 100 may identify a usage type (or purpose) corresponding to a request signal received from the external device 10-1 of the first group. For example, if the request signal received from the external device 10-1 of the first group is configured as shown in Table 2, the server 100 may identify the data usage type (or the purpose) requested by the external device 10-1 of the first group via the usability request vector. The server 100 may identify whether the user has agreed on the usage type (or the purpose) requested by the external device 10-1 of the first group through the metadata of the information for the user of the second group.

In one embodiment, if the user of the second group is identified as not having agreed on the data sharing of the first type of data, the server 100 may transmit a signal, to the external device 10-1 of the first group, that the first type of data is not shared in operation S480. In another embodiment, if the user of the second group is identified as having agreed on the data sharing of the first type of data, the server 100 may transmit information about the authority for accessing the first type of data of the second group to the external device 10-1 of the first group in operation S490.

In one embodiment, the server 100 may request a server 20 of the second group with information about the authority for accessing the first type of data of the second group for a predetermined time. The server 100 may receive information about the access token for accessing the first type of data of the second group from the server 20 of the second group a predetermined time. The predetermined time may be included in the request signal received from the external device 10-1 of the first group, as shown in Table 2.

In another embodiment, the server 100 may receive information about authority for accessing a particular type of data from a third group, and may be given authority in advance to transmit information about the authority to another group if the predefined condition is satisfied. The server 100 may transmit, to the first external device 10-1 of the first group, information on the authority which has been received in advance including the predetermined time that the external device 10-1 of the first group requests data sharing. The external device 10-1 of the first group may access a region in which the first type of data is stored through information on the authority for accessing the received first type of data of the second group in operation S495.

Figure 5:
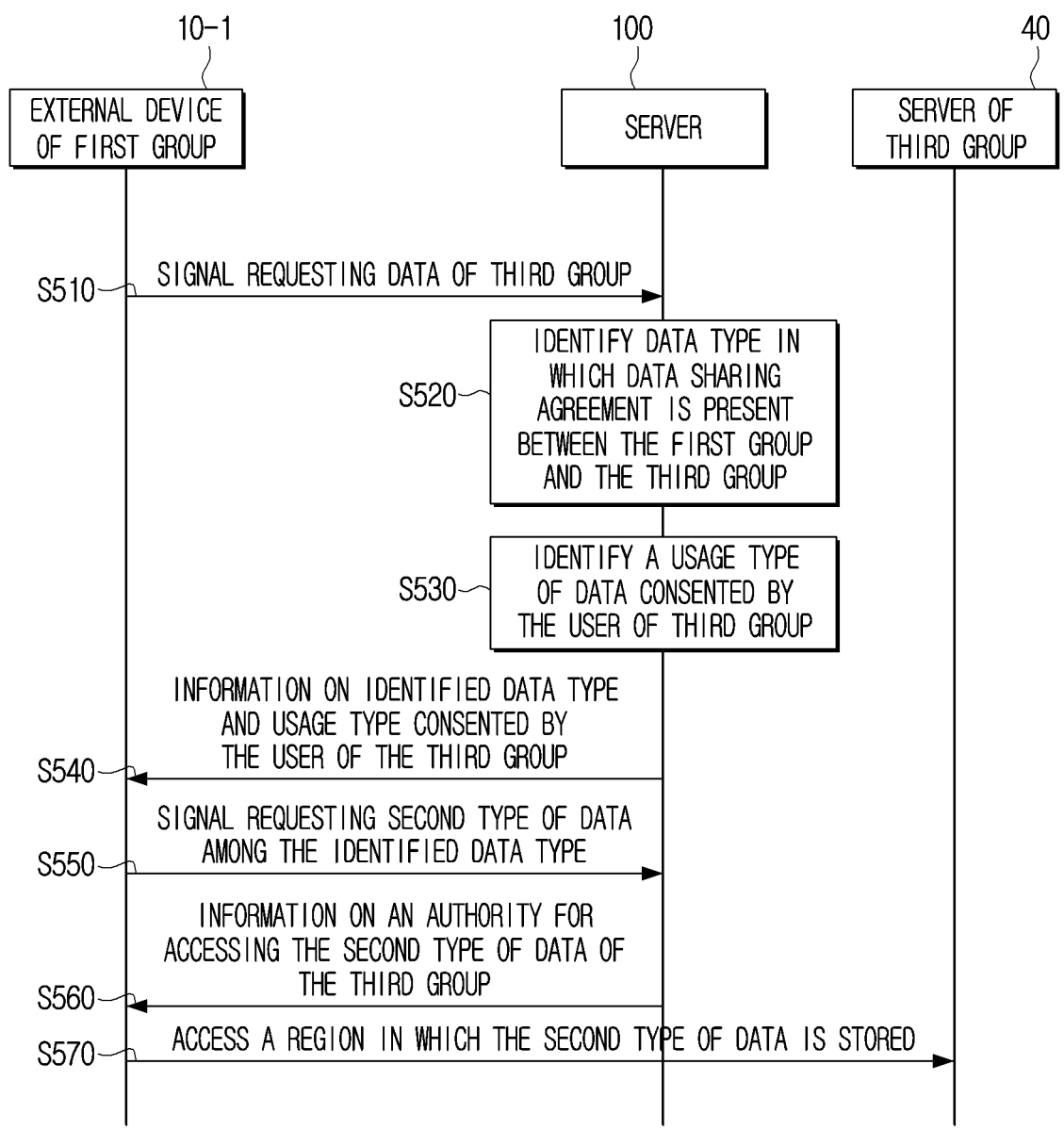
FIG. 5 is a sequence diagram illustrating a method of a server controlling data sharing among each group according to an embodiment of the disclosure.

FIG. 5 is a sequence diagram illustrating a method of a server controlling data sharing among groups according to an embodiment. The process of receiving, by the server 100, the metadata from a server of each group has been described in detail with reference to FIG. 3 and redundant descriptions will not be further provided.

The external device 10-1 of the first group may transmit a signal requesting the third group data to the server 100 in operation S510. The request signal may be configured as shown in Table 2. Upon receiving the request signal for the third group data from the external device 10-1 of the first group, the server 100 may identify the type of data for which there is a data sharing agreement between the first group and the third group based on information about the data sharing agreement among the plurality of groups in operation S520. In one embodiment, the server 100 may identify vectors $J_{1,3}$ or $J_{3,1}$ including information about a data sharing agreement between the first group and the third group among the information for a data sharing agreement among a plurality of groups configured in a matrix form, such as Equation 1. The server 100 may identify the type of data corresponding to the element having a value of 1 among the elements included in the vectors $J_{1,3}$, or $J_{3,1}$. For example, if the first element of $J_{1,3}$ is 1, and the type of data corresponding to the first element is e-mail, the server 100 may identify that there is a data sharing agreement for e-mail information between the first group and the third group.

In step S530, the server 100 may identify the identified data use scheme (or the purpose) consented by the user of the third group based on the metadata of the information for the user of the third group. For example, the server 100 may identify information about a usage type (or a purpose) consented by a user of the third group via the usability vector among the metadata configured as shown in Table 1.

The server 100 may transmit information on the identified data type and the usage types (or purposes) consented by the user of the third group to the external device 10-1 of the first group in operation S540. The server 100 may transmit information about a data type that is identified such that the data sharing agreement between the first group and the third group is present and the information on the data usage types consented by the user of the third group to the external device 10-1 of the first group. The external device 10-1 of the first group may transmit, to the server 100, a signal requesting the second type of data among the identified data types based on the information received from the server 100 in operation S550. The external device 10-1 of the first group may transmit, to the server 100, a signal requesting the third group data in a data type in which the data agreement exists and a usage type (or purpose) consented by the user of the third group.

For example, if there is a data sharing agreement between the first group and the third group with respect to the second type of data, upon receiving a request signal that the user of the third group is to use the second type of data of the third group as the usage type (or purpose) consented by the user of the third group, the server 100 may transmit information about the authority for accessing the second type of data of the third group in operation S560. In one embodiment, upon receiving a signal requesting the second type of data of the third group, the server 100 may transmit a signal requesting the information on the authority for accessing the second type of data for a predetermined time from a server 40 of the third group. Upon receiving the request signal, the server 40 of the third group may transmit, to the server 100, the information on the access token for accessing the second type of data for a predetermined time. The server 100 may transmit information about the access token accessible to the second type of data of the third group to the external device 10-1 of the first group for a predetermined period.

In another embodiment, the server 100 may receive information about the authority accessing the second type of data from a third group, and may be given the authority to transmit information about the authority to another group in advance, when the predefined condition is satisfied. The predefined condition may be whether there exists a data sharing agreement on the second type of data between the first group and the third group and whether the user of the third group has agreed upon data utilization. If the predefined condition is satisfied, the server 100 may transmit, to the external device 10-1 of the first group, information about the previously granted authority, including the predetermined time that the external device 10-1 of the first group has requested data sharing. The external device 10-1 of the first group may access the region in which the second type of data of the third group is stored in operation S570.

Figure 6:
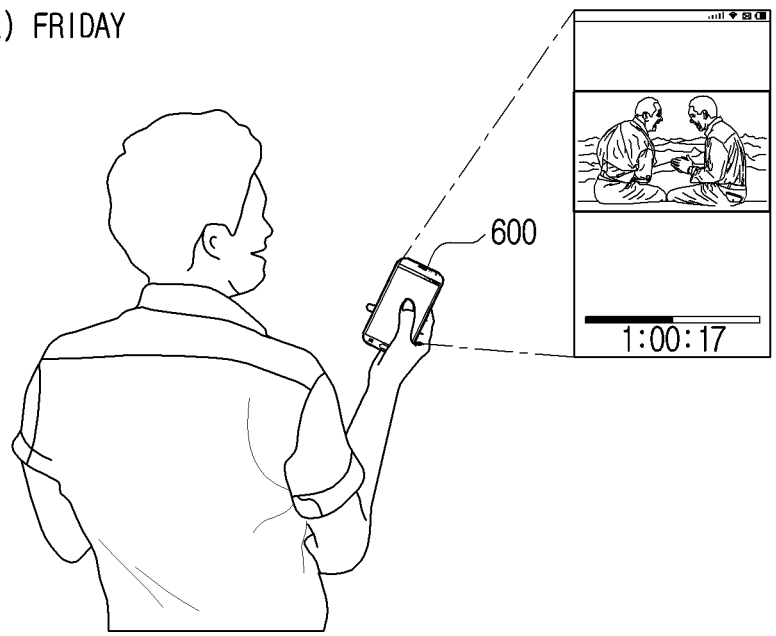
FIG. 6 is a diagram illustrating a method of a server controlling data sharing of each group according to an embodiment of the disclosure.
Figure 6:

FIG. 6 is a diagram illustrating a method in which a server controls data sharing of each group, according to an embodiment.

As illustrated in FIG. 6, an external device 620 of the first group may be implemented as a display device of company A, an external device 600 of the second group may be implemented as a smart phone of company B, and the governance server 100 may be implemented as a server of the company B. However, this is merely exemplary, and the group may be variously implemented with a country, a region, an organization, an international organization, an enterprise, or the like, and the external device may also be implemented as a variety of electronic devices.

Referring to (a) of FIG. 6, the smartphone 600 of the company B may display image content by a user command.

The smartphone 600 of company B may transmit information on the image content currently viewed by the user (e.g., the title of the image content, the date at which the image content is played, an application running to play the image content, information about the playback time of the image content, or the like) to the server of company B.

Referring to (b) of FIG. 6, the display device 620 of company A may receive a voice, "Please turn on the movie I have watched on Friday via smartphone" from the user. The display device 620 of company A may recognize the inputted user voice and transmit a signal requesting information on the movie which has been watched on Friday via a smartphone to the server of company B connected to the smartphone of the user. In one embodiment, the display device 620 of the company A may store information about the user's smartphone or information about the server of company B logged into the user account corresponding to the user's smartphone. The display device 620 of company A may receive a signal requesting information on the stored user smartphone or information about the movie that the user has watched on Friday via smartphone to the server of the company B logged into the account corresponding to the user smartphone. The request signal transmitted from the display device 620 of company A to the server of the company B may be configured as shown in Table 2.

Upon receiving a signal requesting information on a movie which the user has watched via a smartphone on Friday, the server of company B may identify whether there is a data sharing agreement related to information on the image content watched by the user between company A and company B. For example, a server of company B may identify an element composed of a vector including information about a data sharing agreement between company A and company B among information about a data sharing agreement among a plurality of groups of N×N matrices. The server of company B may identify whether there is a data sharing agreement related to the information on the image content watched by the user between company A and company B through an element composed of the vector. For example, if the value corresponding to the information about the image content watched by the user among the elements of the vector including the information about the data sharing agreement between company A and company B is 1, the server of company B may identify that there is a data sharing agreement associated with the information about the image content watched by the user between company A and company B. As another example, if the value corresponding to the information about the image content watched by the user among the vectors including the information about the data sharing agreement between company A and company B is 0, the server of company B may identify that there is no data sharing agreement associated with the information about the image content watched by the user between company A and company B.

If it is identified that there is a data sharing agreement related to the information on the image content watched by the user between company A and company B, the server of company B may identify whether the user of company B consents to share information on the image content watched by the user of company B through the metadata of the information about the user of company B. For example, the server of company B may identify a usage type (or purpose) corresponding to the request signal received from the display device of company A. For example, the server of company B may identify via a request signal received from the display device of company A that the device of company A requests the data to reproduce the image content. The server of company B may identify whether the usage type (or purpose) included in the signal requested by the device of company A among the data usage type (or purpose) consented by the user of company B.

If it is identified that the user of company B shares the data in order to reproduce the watched image content again, the server of company B may transmit information on the authority for accessing the information on the image content watched by the user of company B to the display device of company A. The display device of company A may access a region in which information on the image content watched by the user of company B is stored by using the information about the received authority.

Referring to (b) of FIG. 6, the display device of company A may display the image content watched by the user using information on the image content watched by the user of company B obtained by accessing. According to an embodiment, the display device of company A may display a screen for reproducing the image content by using at least one of the title of the image content watched by the user of company B, the date at which the image content is reproduced, the application executed to reproduce the image content, or the information on the reproduction time of the image content.

Figure 7:
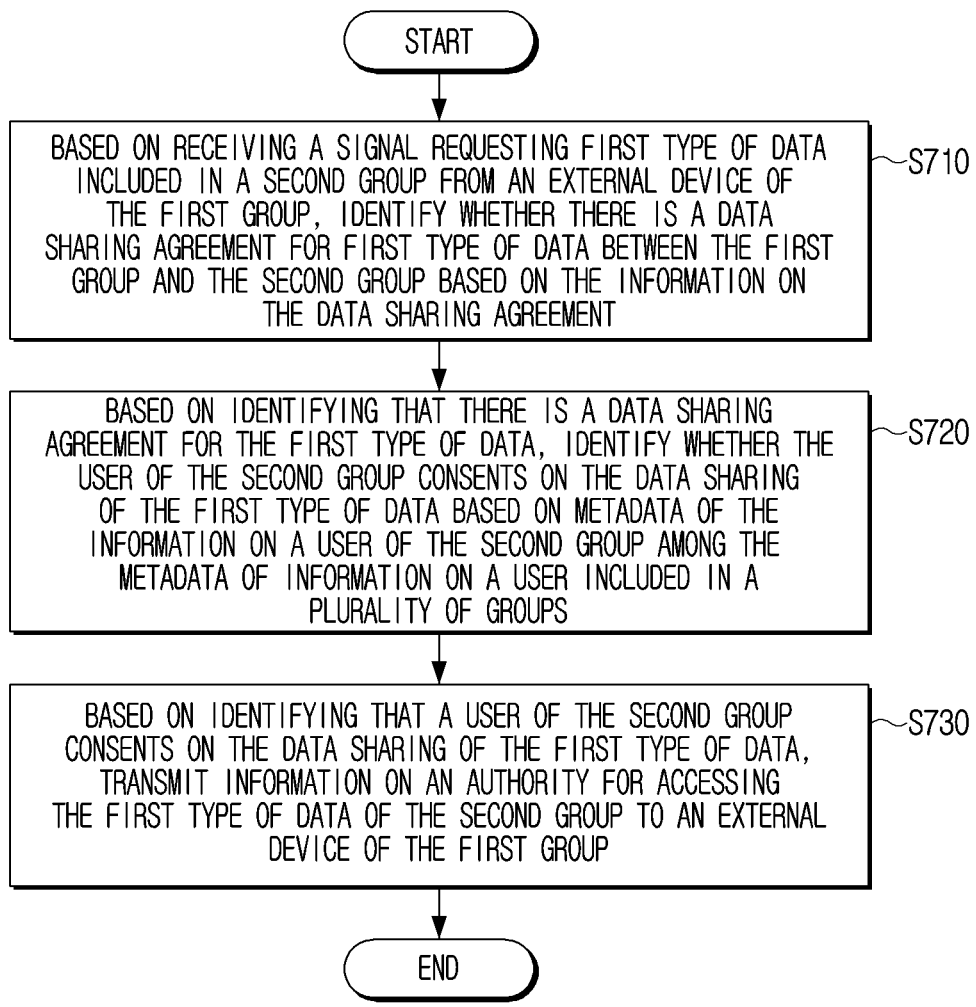
FIG. 7 is a flowchart illustrating a method of controlling a server according to an embodiment of the disclosure.

FIG. 7 is a flow chart illustrating a method of controlling the server, according to an embodiment.

Upon receiving a signal requesting the first type of data included in the second group from the external device of the first group, the server 100 may identify whether there is a data sharing agreement for the first type of data between the first group and the second group based on the information on the data sharing agreement in operation S710. The server 100 may store information about a data sharing agreement between a plurality of groups in a matrix form. The server 100 may identify whether there is a data sharing agreement associated with the first type of data between the first group and the second group of information on the data sharing agreement configured in a matrix form.

If it is identified that there is a data sharing agreement for the first type of data, the server 100 may identify whether the user of the second group has agreed upon the first type of data sharing based on the metadata of the information for the user of the second group among metadata of the information for the user included in the plurality of groups in operation S720. The server 100 may identify a data usage type (or purpose) corresponding to a request signal received from an external device of the first group. The server 100 may identify whether a data usage type corresponding to the identified request signal is included in the data usage type (or the purpose) consented by the user of the second group based on the metadata of the information for each user of the plurality of groups.

If it is identified that the user of the second group has consented on the data sharing of the first type of data, the server 100 may transmit information about the authority to access the first type of data of the second group to the external device of the first group in operation S730. In one embodiment, if the user of the second group is identified to have consented to the data sharing of the first type of data, the server 100 may transmit a signal, to the server of the second group, information about the authority for accessing the first type of data for a predetermined time. Upon receiving the information on the authority for accessing the first type of data received from the server of the second group for a predetermined time, the server 100 may transmit the received information to the external device of the first group. In another embodiment, the server 100 may previously receive and store information about the authority for accessing a specific type of data from the server of the second group, and may be given the authority to redirect information about the authority to other groups. The server 100 may transmit, to the external device 10-1 of the first group, information on the authority previously received including the predetermined time that the external device 10-1 of the first group has requested data sharing.

The external device of the first group may access the first type of data of the second group based on the received information on the authority for accessing the data.

As described above, according to various embodiments, the server may monitor and control the data sharing request status and sharing process between heterogeneous groups, so that each user of the heterogeneous groups may utilize data of other groups to protect personal information and to meet the data sharing agreement at the same time.

It should be understood that the disclosure is not limited to the specific embodiments described hereinafter, but includes various modifications, equivalents, and/or alternatives of the embodiments of the disclosure. In relation to explanation of the drawings, similar drawing reference numerals may be used for similar constituent elements.

It is to be understood that the terms such as "comprise" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

In the description, the term "A or B", "at least one of A or/and B", or "one or more of A or/and B" may include all possible combinations of the items that are enumerated together. For example, the term "at least one of A or/and B" means (1) including at least one A, (2) including at least one B, or (3) including both at least one A and at least one B.

In the description, the terms "first," "second," and so forth are used to describe diverse elements regardless of their order and/or importance and to discriminate one element from other elements, but are not limited to the corresponding elements.

If it is described that a certain element (e.g., first element) is "operatively or communicatively coupled with/to" or is "connected to" another element (e.g., second element), it should be understood that the certain element may be connected to the other element directly or through still another element (e.g., third element). On the other hand, if it is described that a certain element (e.g., first element) is "directly coupled to" or "directly connected to" another element (e.g., second element), it may be understood that there is no element (e.g., third element) between the certain element and the another element.

Also, the expression "configured to" used in the disclosure may be interchangeably used with other expressions such as "suitable for," "having the capacity to," "designed to," "adapted to," "made to," and "capable of," depending on cases. Meanwhile, the term "configured to" does not necessarily mean that a device is "specifically designed to" in terms of hardware. Instead, under some circumstances, the expression "a device configured to" may mean that the device "is capable of" performing an operation together with another device or component. For example, the phrase "a processor configured to perform A, B, and C" may mean a dedicated processor (e.g.: an embedded processor) for performing the corresponding operations, or a generic-purpose processor (e.g.: a CPU or an application processor) that can perform the corresponding operations by executing one or more software programs stored in a memory device.

Various embodiments of the disclosure may be implemented in software, including instructions stored on machine-readable storage media readable by a machine (e.g., a computer). An apparatus may read and load instructions from the storage medium, and execute the called instruction, including an electronic apparatus (for example, electronic device 100) according to the disclosed embodiments. When the instructions are executed by a processor, the processor may perform a function corresponding to the instructions directly or by using other components under the control of the processor. The instructions may include a code generated by a compiler or a code executable by an interpreter. A machine-readable storage medium may be provided in the form of a non-transitory storage medium. Herein, the term "non-transitory" only denotes that a storage medium does not include a signal but is tangible, and does not distinguish the case in which a data is semi-permanently stored in a storage medium from the case in which a data is temporarily stored in a storage medium. For example, "non-transitory storage medium" may include a buffer in which data is temporarily stored.

According to an embodiment, the method according to the above-described embodiments may be provided as being included in a computer program product. The computer program product may be traded as a product between a seller and a consumer. The computer program product may be distributed online in the form of machine-readable storage media (e.g., compact disc read only memory (CD-ROM)) or through an application store (e.g., Play Store™ and App Store™) or distributed online. In the case of online distribution, at least a portion of the computer program product (e.g., a downloadable app) may be at least temporarily stored or temporarily generated in a server of the manufacturer, a server of the application store, or a machine-readable storage medium such as memory of a relay server.

According to the embodiments, the respective elements (e.g., module or program) of the elements mentioned above may include a single entity or a plurality of entities. According to the embodiments, at least one element or operation from among the corresponding elements mentioned above may be omitted, or at least one other element or operation may be added. Alternatively or additionally, a plurality of components (e.g., module or program) may be combined to form a single entity. In this case, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

What is claimed is:

1. A server comprising:
a communicator;
a memory storing instructions, information on a data sharing agreement among a plurality of groups and metadata of information of users included in the plurality of groups; and
a processor configured to execute the stored instructions to:
in response to receiving, from an external device through the communicator, a request signal requesting a first type of data from a second group among the plurality of groups, identify a group ID corresponding to the external device based on an external device ID included in the request signal,
in response to the group ID being identified as corresponding to a first group among the plurality of groups, identify whether the data sharing agreement indicates that sharing the first type of data between the first group and the second group is authorized based on the information on the data sharing agreement,
based on identifying that sharing the first type of data between the first group and the second group is authorized, identify whether a user of the second group authorizes sharing of the first type of data based on metadata of information on the user of the second group among the metadata of the information of the users included in the plurality of groups, and
based on identifying that the user of the second group authorizes sharing of the first type of data, control the communicator to transmit information on an authority for the external device to access the first type of data.

2. The server of claim 1, wherein the processor is further configured to, based on identifying that sharing the first type of data between the first group and the second group is not authorized, control the communicator to transmit, to the external device, a signal indicating that the first type of data is not sharable.

3. The server of claim 1, wherein the metadata of information of the users included in the plurality of groups comprises information on types of data authorized by the users of the plurality of groups.

4. The server of claim 3, wherein the processor is further configured to:
identify a type of data corresponding to the request signal received from the external device, and
identify whether the type of data is included among the types of data authorized by the user of the second group based on the metadata of information of the users of the plurality of groups.

5. The server of claim 4, wherein the processor is further configured to:
based on the type of data included among the types of data authorized by the user of the second group, control the communicator to transmit, to the external device, a key for accessing the first type of data, and
based on the type of data not being authorized, control the communicator to transmit, to the external device, a signal indicating that the first type of data is not sharable.

6. The server of claim 1, wherein the processor is further configured to:
based on receiving, from the external device through the communicator, a request signal requesting data of a third group among the plurality of groups, identify a second type of data identified by the data sharing agreement that is sharable between the first group and the third group based on the information on the data sharing agreement, and
identify a type of use of the second type of data authorized by a user of the third group based on metadata of information on the user of the third group among the metadata of the information of the users included in the plurality of groups.

7. The server of claim 6, wherein the processor is further configured to:
control the communicator to transmit, to the external device, the second type of data and information on the type of use of the second type of data authorized by the user of the third group, and
based on receiving, from the external device, the request signal requesting the second type of data, control the communicator to transmit a key, to the external device, for accessing the second type of data.

8. The server of claim 1, wherein the information on the data sharing agreement indicates whether each type of data among a plurality of types of data is sharable between each group among the plurality of groups.

9. The server of claim 8, wherein the information on the data sharing agreement is stored in an N×N matrix format in which N is a number of groups of the plurality of groups, and an element included in the N×N matrix format is a vector capable of identifying whether a data sharing agreement for a type of data among the plurality of types of data is present between groups among the plurality of groups.

10. The server of claim 1, wherein the information on the authority for the external device to access the first type of data comprises information on an access token for accessing the first type of data in the second group for a preset time.

11. A method of controlling a server storing information on a data sharing agreement among a plurality of groups and metadata of information of users included in the plurality of groups, the method comprising:
in response to receiving, from an external device, a request signal requesting a first type of data from a second group among the plurality of groups, identifying a group ID corresponding to the external device based on an external device ID included in the request signal,
in response to the group ID being identified as corresponding to a first group among the plurality of groups, identifying whether the data sharing agreement indicates that sharing the first type of data between the first group and the second group is authorized based on the information on the data sharing agreement;
based on identifying that sharing the first type of data between the first group and the second group is authorized, identifying whether a user of the second group authorizes sharing of the first type of data based on metadata of information on the user of the second group among the metadata of the information of the users included in the plurality of groups; and
based on identifying that the user of the second group authorizes sharing of the first type of data, transmitting information on an authority for the external device to access the first type of data.

12. The method of claim 11, further comprising:
based on identifying that sharing the first type of data between the first group and the second group is not authorized, transmitting, to the external device, a signal indicating that the first type of data is not sharable.

13. The method of claim 11, wherein the metadata of information of the users included in the plurality of groups comprises information on types of data authorized by the users of the plurality of groups.

14. The method of claim 13, wherein the identifying that the user of the second group authorizes sharing of the first type of data comprises:
identifying a type of data corresponding to the request signal received from the external device; and
identifying whether the type of data is included among the types of data authorized by the user of the second group based on the metadata of information of the users of the plurality of groups.

15. The method of claim 14, further comprising:
based on the type of data included among the types of data authorized by the user of the second group, transmitting, to the external device, a key for accessing the first type of data, and
based on the type of data not being authorized, transmitting, to the external device, a signal indicating that the first type of data is not sharable.

16. The method of claim 11, further comprising:
based on receiving, from the external device, a request signal requesting data of a third group among the plurality of groups, identifying a second type of data identified by the data sharing agreement that is sharable between the first group and the third group based on the information on the data sharing agreement; and
identifying a type of use of the second type of data authorized by a user of the third group based on metadata of information on the user of the third group among the metadata of the information of the users included in the plurality of groups.

17. The method of claim 16, wherein the identifying the second type of data identified by the data sharing agreement that is sharable between the first group and the third group comprises:
transmitting, to the external device, the second type of data and information on the type of use of the second type of data authorized by the user of the third group; and
based on receiving, from the external device, the request signal requesting the second type of data, transmitting, to the external device a key for accessing the second type of data.

18. The method of claim 11, wherein the information on the data sharing agreement indicates whether each type of data among a plurality of types of data is sharable between each group among the plurality of groups.

19. The method of claim 18, wherein the information on the data sharing agreement is stored in an N×N matrix format in which N is a number of groups of the plurality of groups, and an element included in the N×N matrix format is a vector capable of identifying whether a data sharing agreement for a type of data among the plurality of types of data is present between groups among the plurality of groups.

20. The method of claim 11, wherein the information on the authority for the external device to access the first type of data comprises information on an access token for accessing the first type of data in the second group for a preset time.

* * * * *